(12) United States Patent
Onimatsu

(10) Patent No.: US 9,931,798 B2
(45) Date of Patent: Apr. 3, 2018

(54) TIRE VULCANIZING METHOD AND TIRE MANUFACTURING METHOD

(71) Applicant: SUMITOMO RUBBER INDUSTRIES, LTD., Kobe-shi, Hyogo (JP)

(72) Inventor: Hiroyuki Onimatsu, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 415 days.

(21) Appl. No.: 14/427,553

(22) PCT Filed: Sep. 17, 2013

(86) PCT No.: PCT/JP2013/075041
§ 371 (c)(1),
(2) Date: Mar. 11, 2015

(87) PCT Pub. No.: WO2014/054416
PCT Pub. Date: Apr. 10, 2014

(65) Prior Publication Data
US 2015/0246494 A1 Sep. 3, 2015

(30) Foreign Application Priority Data

Oct. 2, 2012 (JP) ................................. 2012-220604

(51) Int. Cl.
*B29D 30/06* (2006.01)
*B29D 30/12* (2006.01)
*B29D 30/00* (2006.01)

(52) U.S. Cl.
CPC ..... *B29D 30/0662* (2013.01); *B29D 30/0005* (2013.01); *B29D 30/0603* (2013.01);
(Continued)

(58) Field of Classification Search
CPC ............ B29D 30/0662; B29D 30/0005; B29D 30/0633; B29D 30/12; B29D 30/0666
See application file for complete search history.

(56) References Cited

U.S. PATENT DOCUMENTS 4,525,320 A * 6/1985 Sarumaru .......... B29D 30/0005
264/315
5,908,531 A * 6/1999 Laurent .................. B29D 30/00
156/111
(Continued)

FOREIGN PATENT DOCUMENTS

JP 7-223275 A 8/1995
JP 2000-84937 A 3/2000
(Continued)

OTHER PUBLICATIONS

International Search Report issued in PCT/JP2013/075041, dated Jan. 7, 2014.
(Continued)

*Primary Examiner* — Jacob T Minskey
*Assistant Examiner* — Melody Tsui
(74) *Attorney, Agent, or Firm* — Birch, Stewart, Kolasch & Birch, LLP

(57) ABSTRACT

The purpose of the present invention is to efficiently vulcanize a green tire. This tire vulcanizing method and tire manufacturing method for vulcanizing a green tire 2A formed on an outer surface 11s of a rigid core by putting in a vulcanizing mold together with the rigid core 3A. The method comprising: a preheating step S1 of preheating the rigid core accompanied by green tire 3A using a preheating device 5 arranged adjacent to the vulcanizing mold 4 prior to vulcanizing; a vulcanizing step S3 of vulcanizing the green tire accompanied by preheated rigid core 3A using the vulcanizing mold 4; and a cooling step S5 of cooling the
(Continued)

rigid core accompanied by vulcanized tire 3B which has a vulcanized tire 2B made by vulcanizing the green tire 2A by use of a cooling device 6.

12 Claims, 13 Drawing Sheets

(52) U.S. Cl.
CPC ......... *B29D 30/0633* (2013.01); *B29D 30/12* (2013.01); *B29D 2030/0666* (2013.01)

(56) References Cited

U.S. PATENT DOCUMENTS

| | | | | |
|---|---|---|---|---|
| 2005/0226951 | A1* | 10/2005 | Kata | B29C 37/005 425/36 |
| 2009/0121395 | A1* | 5/2009 | Marchini | B29D 30/0005 264/552 |

FOREIGN PATENT DOCUMENTS

| | | | |
|---|---|---|---|
| JP | 2006-160236 | A | 6/2006 |
| JP | 2006-297778 | A | 11/2006 |
| JP | 2006-327211 | A | 12/2006 |
| JP | 2006327211 | A * | 12/2006 |
| JP | 2009-208400 | A | 9/2009 |
| JP | 2 886 282 | A1 | 6/2015 |

OTHER PUBLICATIONS

Extended European Search Report, dated Apr. 25, 2016, for European Application No. 13843924.5.

* cited by examiner

TIRE VULCANIZING METHOD AND TIRE MANUFACTURING METHOD

TECHNICAL FIELD

The present invention relates to a tire vulcanizing method capable of effectively vulcanizing a green tire.

BACKGROUND ART

In recent years, in order to improve the forming accuracy of the tire, a rigid core comprising an outer surface for molding a tire inner surface shape is used. In the manufacturing method using such a rigid core, firstly, a green tire forming step is performed. In this step, tire components such as a carcass ply and the like are sequentially arranged on the outer surface of the rigid core. Then, the rigid core accompanied by green tire is put in a vulcanizing mold, and a vulcanizing step of vulcanizing the green tire is carried out.

In the vulcanizing step, after putting the rigid core accompanied by green tire in the vulcanizing mold, a heating step of heating the rigid core and the vulcanizing mold is performed. Also, after the vulcanization, in order to remove the rigid core from the vulcanized tire, a cooling step of cooling the rigid core accompanied by vulcanized tire inside the vulcanizing mold is performed. A related art is as follows:

Patent Document 1: Japanese Unexamined Patent Application Publication No. 2006-160236.

DISCLOSURE OF THE INVENTION

Problems to be Solved by the Invention

In a continuous production line of the tire, heat used in a previous vulcanizing cycle is stored in the vulcanizing mold. Therefore, shortly after putting the rigid core accompanied by green tire (meaning an assembly of the green tire and the rigid core) in the vulcanizing mold, a temperature of the rigid core often lower than a temperature of the vulcanizing mold. Therefore, in the heating step, there is a problem that it needs a lot of time to heat the rigid core.

In the cooling step, affected by the heat of the vulcanizing mold, the rigid core accompanied by vulcanized tire (meaning an assembly of the vulcanized tire and the rigid core) cannot be efficiently cooled. Therefore, there is a problem that much time is required to cool the rigid core accompanied by vulcanized tire.

Thus, in the manufacturing method described above, the heating step and the cooling step require much time, and there is a problem that it is difficult to efficiently vulcanize the green tire. Furthermore, since the vulcanizing mold is taken over for a long time, there is a problem of increase of the cycle time.

In view of above-mentioned facts, it is an object of the present invention to provide a tire vulcanizing method and a tire manufacturing method capable of efficiently vulcanizing a green tire. The present invention is grounded in preheating the rigid core accompanied by green tire by use of a preheating device arranged adjacent to a vulcanizing mold prior to vulcanization and in cooling the rigid core accompanied by vulcanized tire by use of a cooling device arranged adjacent to the vulcanizing mold after the vulcanization.

Means for Solving the Problems

The present invention is directed to a tire vulcanizing method for vulcanizing a green tire formed on an outer surface of a rigid core by putting in a vulcanizing mold together with the rigid core. The method comprises a preheating step of preheating the rigid core accompanied by green tire using a preheating device arranged adjacent to the vulcanizing mold prior to vulcanizing; a first transferring step of transferring the preheated rigid core accompanied by green tire from the preheating device to the vulcanizing mold, a vulcanizing step of vulcanizing the green tire accompanied by preheated rigid core using the vulcanizing mold, a second transferring step of transferring a rigid core accompanied by vulcanized tire obtained through the vulcanizing step to a cooling device arranged adjacent to the vulcanizing mold, and a cooling step of cooling the rigid core accompanied by vulcanized tire using a cooling device.

In the tire vulcanizing method, it is preferable that the rigid core comprises an airtight chamber therein and that the preheating step includes a high-temperature fluid supplying step of supplying high-temperature fluid into the chamber.

In the tire vulcanizing method, it is preferable that the rigid core comprises a supply flow passage for guiding the high-temperature fluid into the chamber, that the preheating device comprises a supply port detachably connected to the supply flow passage so that the high-temperature fluid is supplied to the supply flow passage, and that the preheating step further includes a step of connecting the supply flow passage of the rigid core accompanied by green tire with the supply port of the preheating device prior to the high-temperature fluid supplying step.

In the tire vulcanizing method, it is preferable that the rigid core comprises an airtight chamber therein, and the cooling step includes a low-temperature fluid supplying step of supplying low-temperature fluid into the chamber.

In the tire vulcanizing method, preferable that the rigid core comprises a supply flow passage for guiding the low-temperature fluid into the chamber, that the cooling device comprises a supply port detachably connected to the supply flow passage so that the low-temperature fluid is supplied to the supply flow passage, and that the cooling step further includes a step of connecting the supply flow passage of the rigid core accompanied by vulcanized tire with the supply port of the cooling device prior to the low-temperature fluid supplying step.

In the tire vulcanizing method, it is preferable that the low-temperature fluid is liquid; and that the cooling step further includes a step of discharging the liquid in the chamber prior to the low-temperature fluid supplying step.

In the tire vulcanizing method, it is preferable that the rigid core comprises a plurality of segments divided in a circumferential direction of the tire; and that the chamber is disposed in each of the segments.

In the tire vulcanizing method, it is preferable that upon the first transferring step and the second transferring step, a holding means for holding the rigid core arranged adjacent to the vulcanizing mold, the preheating device and the cooling device is used, and that the holding means, the vulcanizing mold, the preheating device and the cooling device comprise a detachably connecting means for automatic coupling with the inner mold.

A tire manufacturing method comprises a green tire forming step of forming a green tire on an outer surface of a rigid core, and a green tire vulcanizing step in accordance with the tire vulcanizing method as set forth in any one of claims 1 to 8.

Effect of the Invention

In a tire vulcanizing method of the present invention, prior to vulcanization, a preheating step of preheating a rigid core accompanied by green tire, where a green tire is being formed on an outer surface of a rigid core, by use of the preheating device arranged adjacent to the vulcanizing mold is preformed. Such a preheating step can decrease a difference in temperature between the vulcanizing mold and the rigid core shortly after putting the rigid core accompanied by green tire in the vulcanizing mold. Therefore, in the vulcanization process of in the present invention, it is possible to effectively reduce the heating time of the rigid core.

In the present invention, by using the cooling device arranged adjacent to the vulcanizing mold, a cooling step of cooling the rigid core accompanied by vulcanized tire is performed. Therefore, the rigid core accompanied by vulcanized tire is not affected by the heat of the vulcanizing mold and can be efficiently cooled, thereby preventing deterioration of the tire due to excessive vulcanization.

Thus, the tire vulcanizing method in accordance with the present invention, in the vulcanizing step, can efficiently reduce the heating time and the cooling time, thereby efficiently vulcanizing the green tire.

The respective preheating step and the cooling step are performed using a preheating device and a cooling device which are arranged adjacent to the vulcanizing mold. Thus, this makes it possible to reduce the time that the rigid core accompanied by green tire and the rigid core accompanied by vulcanized tire take over the vulcanizing mold. Furthermore, the preheating step, the vulcanizing step and the cooling step can be performed in parallel. Therefore, the tire vulcanizing method of the present invention can efficiently lessen the cycle time.

DESCRIPTION OF THE SIGN

3A Rigid core accompanied by green tire
3B Rigid core accompanied by vulcanized tire
4 vulcanizing mold
5 Preheating device
6 Cooling device

BEST MODE FOR CARRYING OUT THE INVENTION

Hereinafter, an embodiment of the present invention will be described with reference to the drawings.

A tire manufacturing method (simply abbreviated as a "manufacturing method") of the present invention comprises, a green tire forming step of forming a green tire on an outer surface of a rigid core, and a vulcanizing step of vulcanizing the green tire accompanied by rigid core by putting in a vulcanizing mold by use of after-mentioned vulcanizing method (simply abbreviated as a "vulcanizing method").

Figure 1:
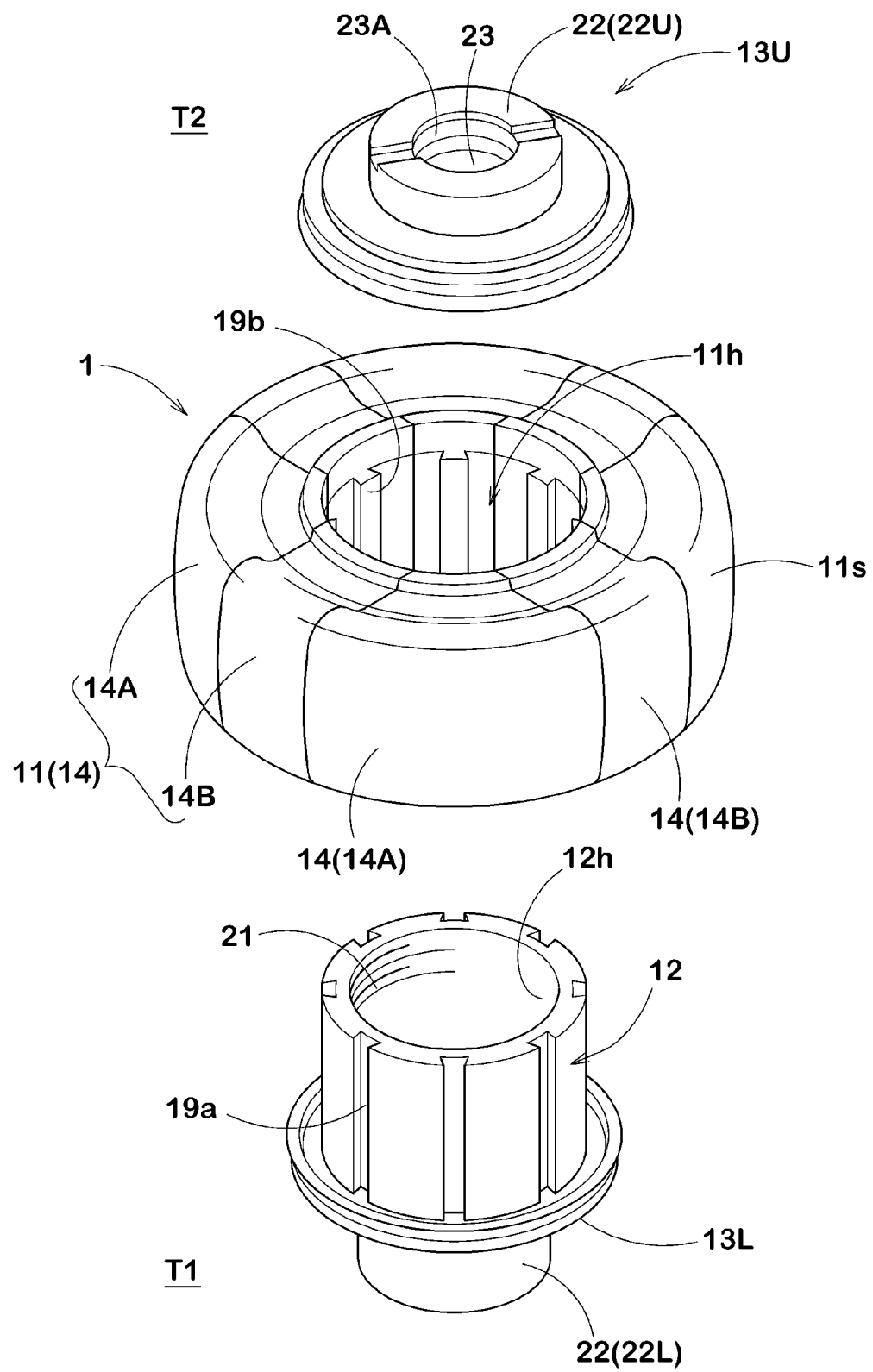
FIG. 1 is an exploded perspective view showing an example of a rigid core according to the present embodiment.
Figure 2:
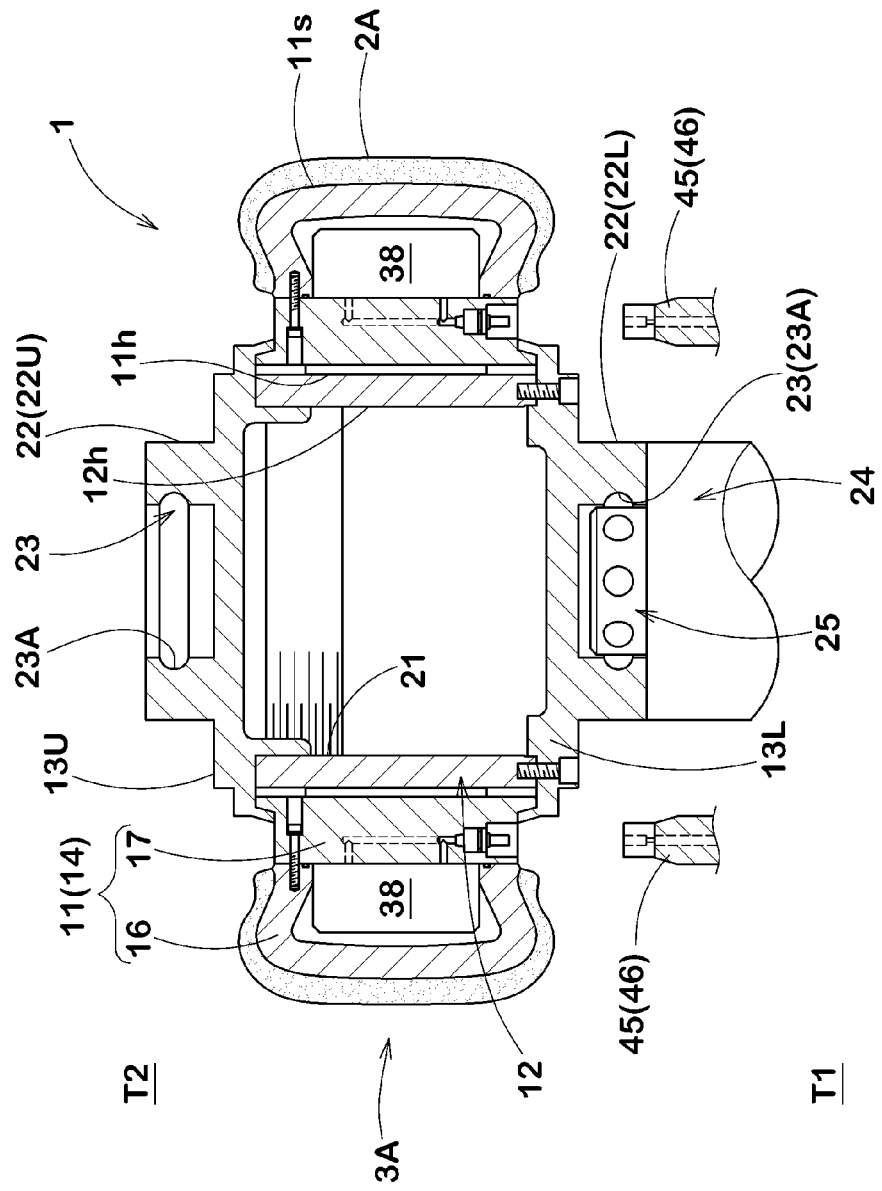
FIG. 2 is a sectional view of a rigid core accompanied by green tire.

As shown in FIGS. 1 and 2, the rigid core 1 comprises an annular core main body 11 having a tire molding surface on its outer surface 11s, a center piece 12 inserted into a center hole 11h of the core main body 11, and a pair of sidewall bodies 13L, 13U disposed on both sides of the core main body 11 in axial direction.

Figure 3:
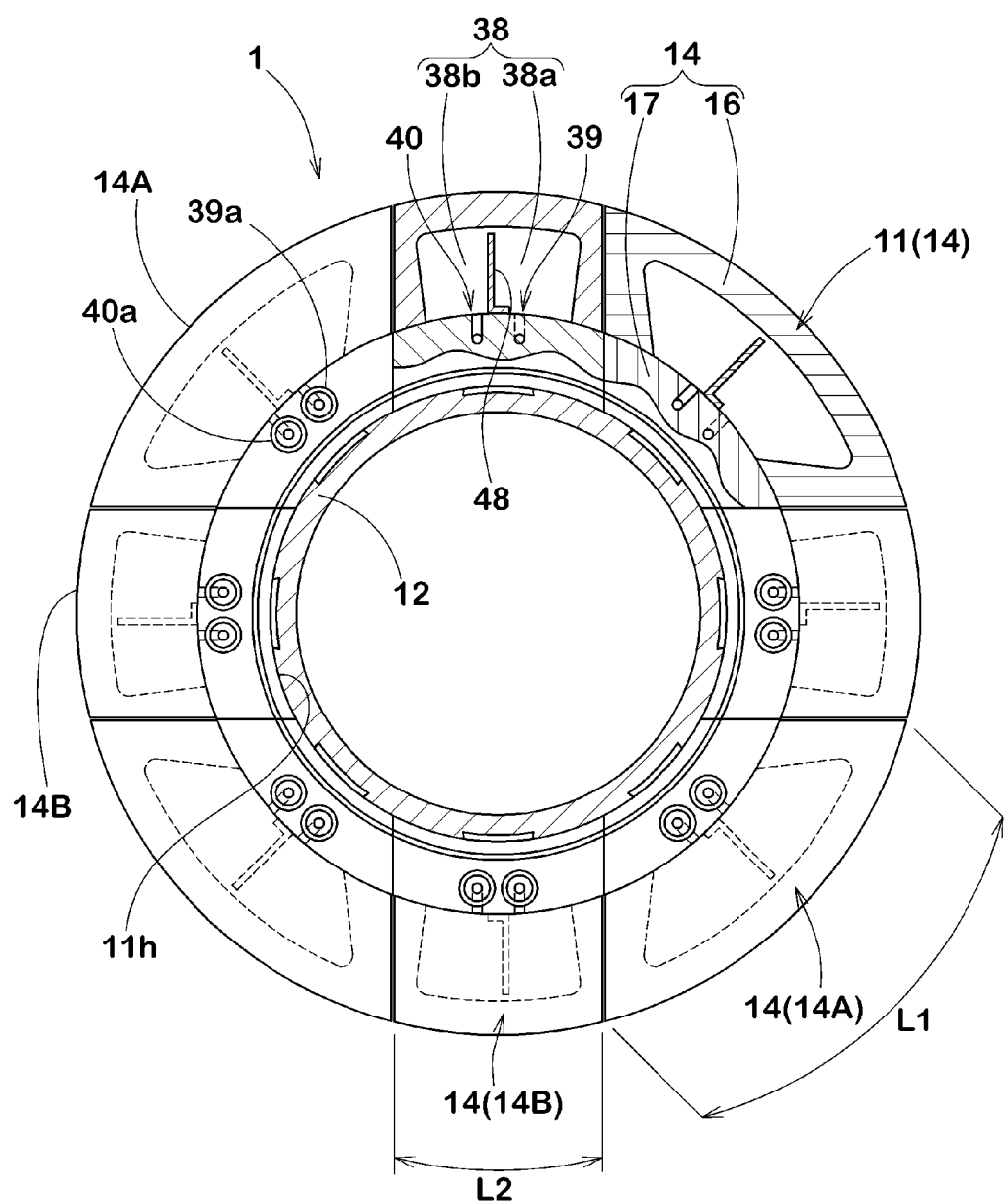
FIG. 3 is a bottom view shoring the core main body with a center piece from an axial direction.

As shown in FIG. 3, the core main body 11 comprises a plurality of segments 14 divided in a circumferential direction of the tire. The segments 14 comprise a first segment 14A and a second segment 14B. The first segment 14A has a circumferential length L1 gradually decreasing toward radially inward. The second segment 14B has a circumferential length L2 gradually increasing toward radially inward. The first segment 14A and the second segment 14B are alternately arranged in the circumferential direction of the tire.

Figure 4:
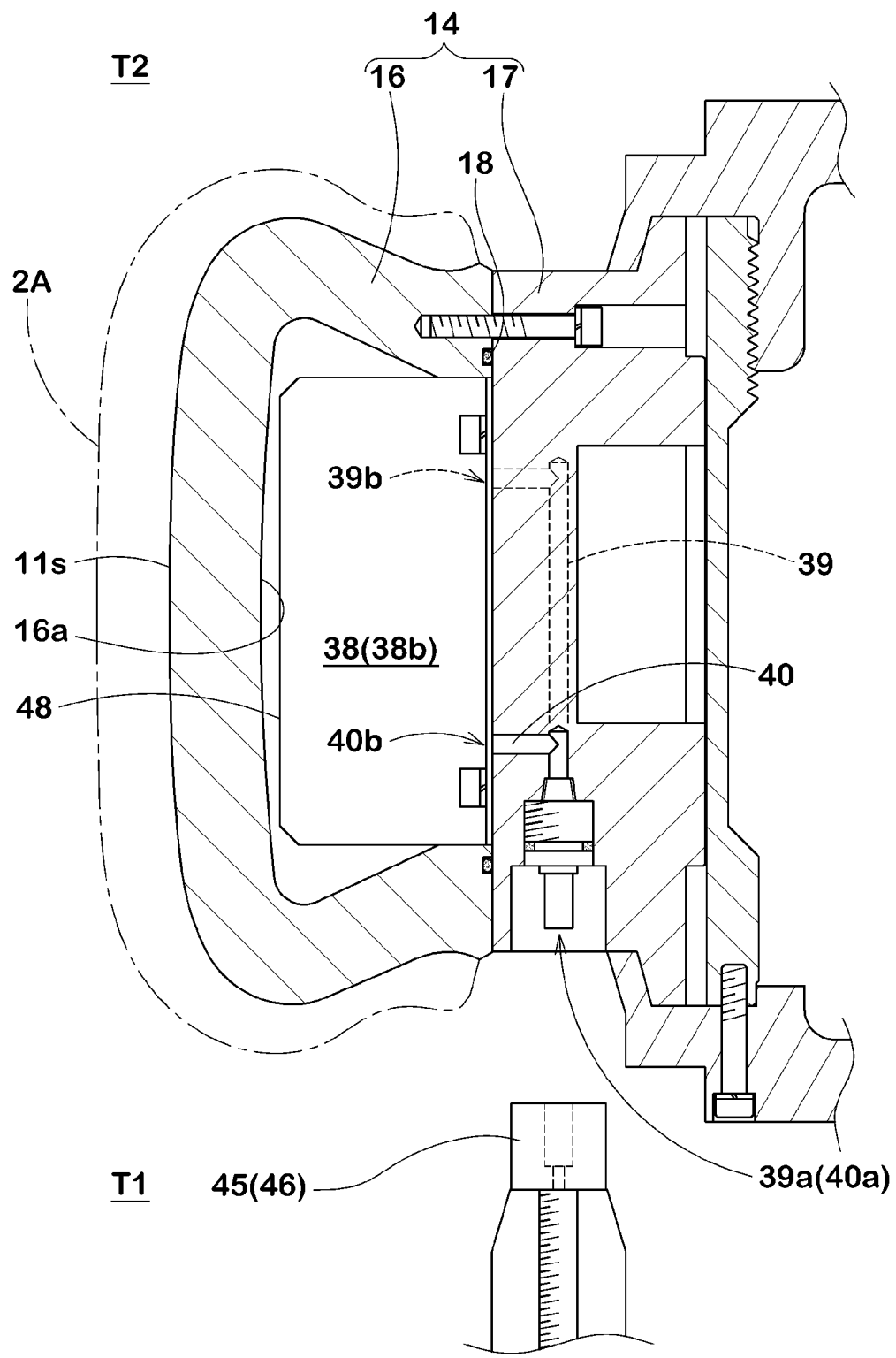
FIG. 4 is a partially enlarged view of FIG. 2.

As shown in FIGS. 3 and 4, each of the segments 14 of the present embodiment comprises an outer segment portion 16 disposed radially outward and an inner segment portion 17 arranged radially inward of the outer segment portion 16. The outer segment portion 16 and the inner segment portion 17 are integrally connected.

As shown in FIGS. 1 and 2, the center piece 12 is formed in a cylindrical shape. The center piece 12 is inserted in the center hole 11h of the core main body 11. As shown in FIG. 1, on an outer peripheral surface of the center piece 12 and an inner peripheral surface of the segments 14, there is provided a dovetail groove 19a and a dovetail tenon 19b extending in axial direction and engaging one another, respectively. Thus, the center piece 12 and the segments 14 are connected relatively-movably only in axial direction. Also, an axially first end side T1 (lower side) of the center piece 12 is fixed to a first sidewall body 13L. Furthermore, as shown in FIGS. 1 and 2, an axially second end side T2 (upper side) of the center piece 12 is fixed to a second sidewall body 13U. The second sidewall body 13U is detachably screwed via an inside screw 21 disposed in the center hole 12h of the center piece 12.

Each outer surface of the sidewall bodies 13L, 13U of the present embodiment is provided with a support shaft portion 22 protruding outward in axial direction. The support shaft portion 22 comprises a first support shaft portion 22L disposed on the first end side T1 (lower side), and a second support shaft portion 22U disposed on the second end side T2 (upper side). Each of the support shaft portions 22L and 22U comprises a joining hole portion 23 recessed from each outer end, and a circumferential groove 23A extending along the inner peripheral surface of the joining hole portion 23. These support shaft portions 22L, 22U are detachably connected to a chuck portion 24 of the vulcanizing mold 4, the preheating device 5, the cooling device 6, the conveying device 7 and the holding means 8 via a connecting means 25.

Figure 5:
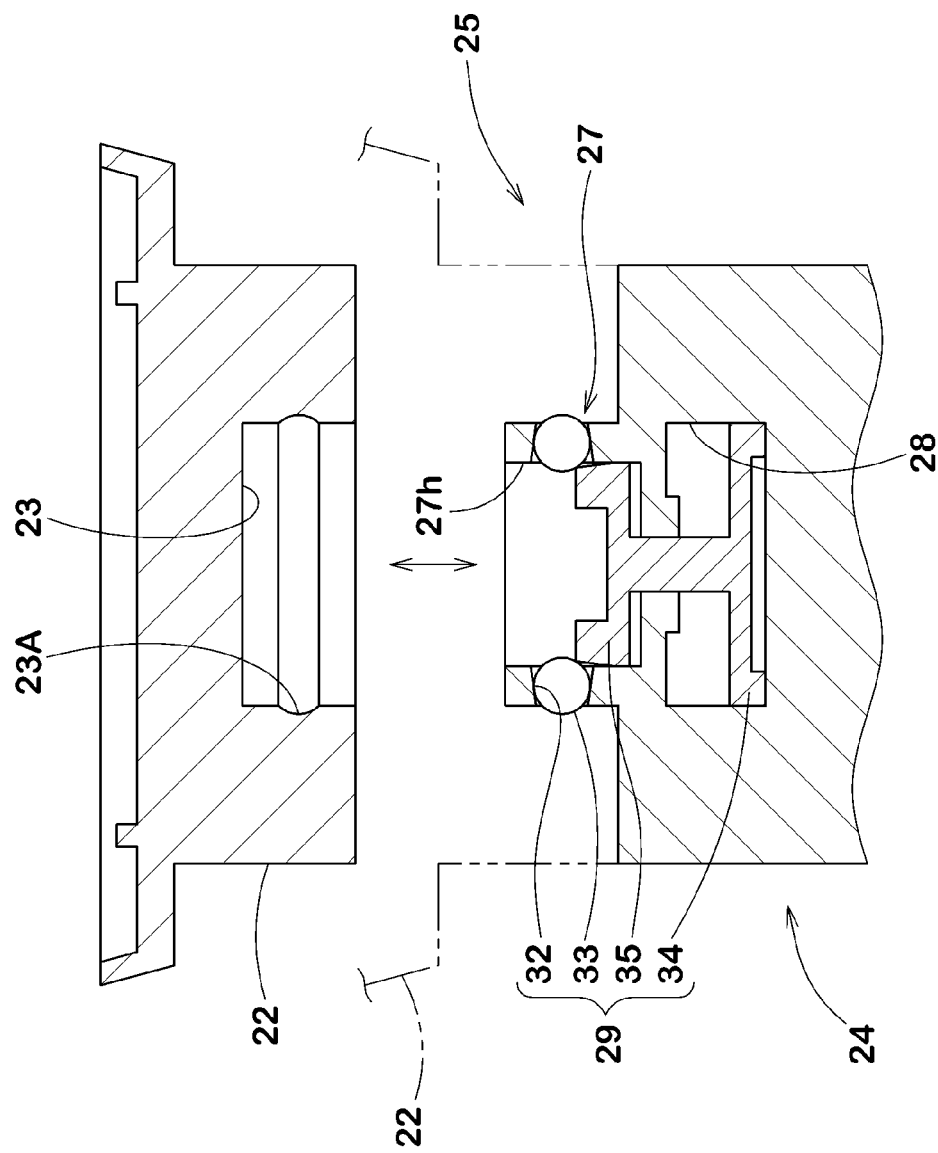
FIG. 5 is a cross-sectional view illustrating a connecting means.

As enlargedly shown in FIG. 5, the chuck portion 24 comprises a connecting cylinder portion 27 inserted in the joining hole portion 23, and a cylinder chamber 28 disposed inward the connecting cylinder portion 27. The connecting cylinder portion 27 has an inner cavity that is communicated with the cylinder chamber 28 in the axial direction of the rigid core 1 (shown in FIG. 1).

The connecting means 25 comprises a joining hole portion 23 of the support shaft portion 22, the connecting cylinder portion 27 of the chuck portion 24 and a ball lock means 29 to lock between the joining hole portion 23 and the connecting cylinder portion 27. The ball lock means 29 comprises a plurality of through-hole 32 passing through in and out of the connecting cylinder portion 27, a ball 33 held in each of the through-holes 32, a piston member 34 housed in the cylinder chamber 28, and a plunger 35 housed in the center hole 27h of the connecting cylinder portion 27. The piston member 34 and the plunger 35 are connected. The piston member 34 and the plunger 35 can be integrally moved by the high-pressure air supplied and discharged to the cylinder chamber 28. The outer peripheral surface of the plunger 35 has a corn-shaped surface tapering toward the outer side in the axial direction.

In order to couple the connecting cylinder portion 27 to the chuck portion 24, the connecting cylinder portion 27 is firstly inserted in the joining hole portion 23 of the support shaft portions 22, and then the plunger 35 is forced outwardly. By the movement of the plunger 35, the ball 33 is pushed outward and pressed against a circumferential groove 23A of the joining hole portion 23. Thus, the connecting means 25 may couple the support shaft portion 22 to the chuck portion 24. In the connecting means 25, pushing force of the ball 33 is released by moving the plunger 35 inwardly. Thus, the connecting means 25 can release the connection between the support shaft portions 22 and the chuck portion 24 and can be detached from the support shaft portion 22.

As shown in FIGS. 3 and 4, the rigid core 1 of the present embodiment comprises a chamber 38 disposed in the interior of each of the segments 14, a supply flow passage 39 communicating with the chamber 38, and an exhaust flow passage 40 communicating with the chamber 38.

The chamber 38 is formed of a hollow portion provided in the radially inner surface of the outer segment portion 16. In the present embodiment, the outer segment portion 16 and the inner segment portion 17 are connected via a sealing 18. Thus, the chamber 38 is kept airtight. The supply flow passage 39 and the exhaust flow passage 40 are disposed in the inner segment portion 17. Furthermore, the supply flow passage 39 and the exhaust flow passage 40 are spaced each other in the circumferential direction of the rigid core 1.

As shown in FIG. 4, the supply flow passage 39 comprises a connecting port 39a that opens the first end side T1 (lower side) of the segments 14, and an opening section 39b that opens at the chamber 38. The connecting port 39a is detachably connected to the supply port 45 supplying the fluid into the supply flow passage 39. As a result, the supply flow passage 39 can guide the fluid supplied from the supply port 45 into the chamber 38.

The exhaust flow passage 40, as well as the supply flow passage 39, comprises a connecting port 40a and an opening section 40b. The connecting port 40a is detachably connected to an exhaust port 46 for discharging the fluid in the chamber 38. Thus, the chamber 38 can circulate the fluid via the supply flow passage 39 and the exhaust flow passage 40. For the connections between the connecting port 39a of the supply flow passage 39 and the supply port 45 and between the connecting port 40a of the exhaust flow passage 40 and the exhaust port 46, an automatically detachable connector pair is desirably employed which has an automatically detachable safety valve to each other. Such an automatically detachable connector pair can supply or discharge the fluid only when connected, thereby improving safety.

In the present embodiment, the opening section 40b of the exhaust flow passage 40 is disposed in the first end side T1 (lower side) closer than the opening section 39b of the supply flow passage 39. This serves to smoothly discharge the fluid in the chamber 38. The exhaust port 46 is desirably provided with a thermometer (not shown). Such a thermometer can measure a temperature of the fluid shortly discharged from the chamber 38, and it serves to accurately grasp the heating state or cooling state of a rigid core accompanied by green tire 3A.

As shown in FIG. 3, the inner segment portion 17 is provided with a bulkhead plate 48 on its radially outer surface. The bulkhead plate 48 communicatably divides the chamber 38 into a first chamber 38a communicating with the supply flow passage 39 and a second chamber 38b communicating with the exhaust flow passage 40. Such a bulkhead plate 48 serves to circulate the fluid evenly into the first chamber 38a and the second chamber 38b.

In the green tire forming step, as shown in FIG. 2, according to conventional methods, tire components such as the inner liner and the carcass ply and the like are sequentially arranged on above-mentioned outer surface 11s of the rigid core 1. Thus, the green tire 2A is formed.

Figure 6:
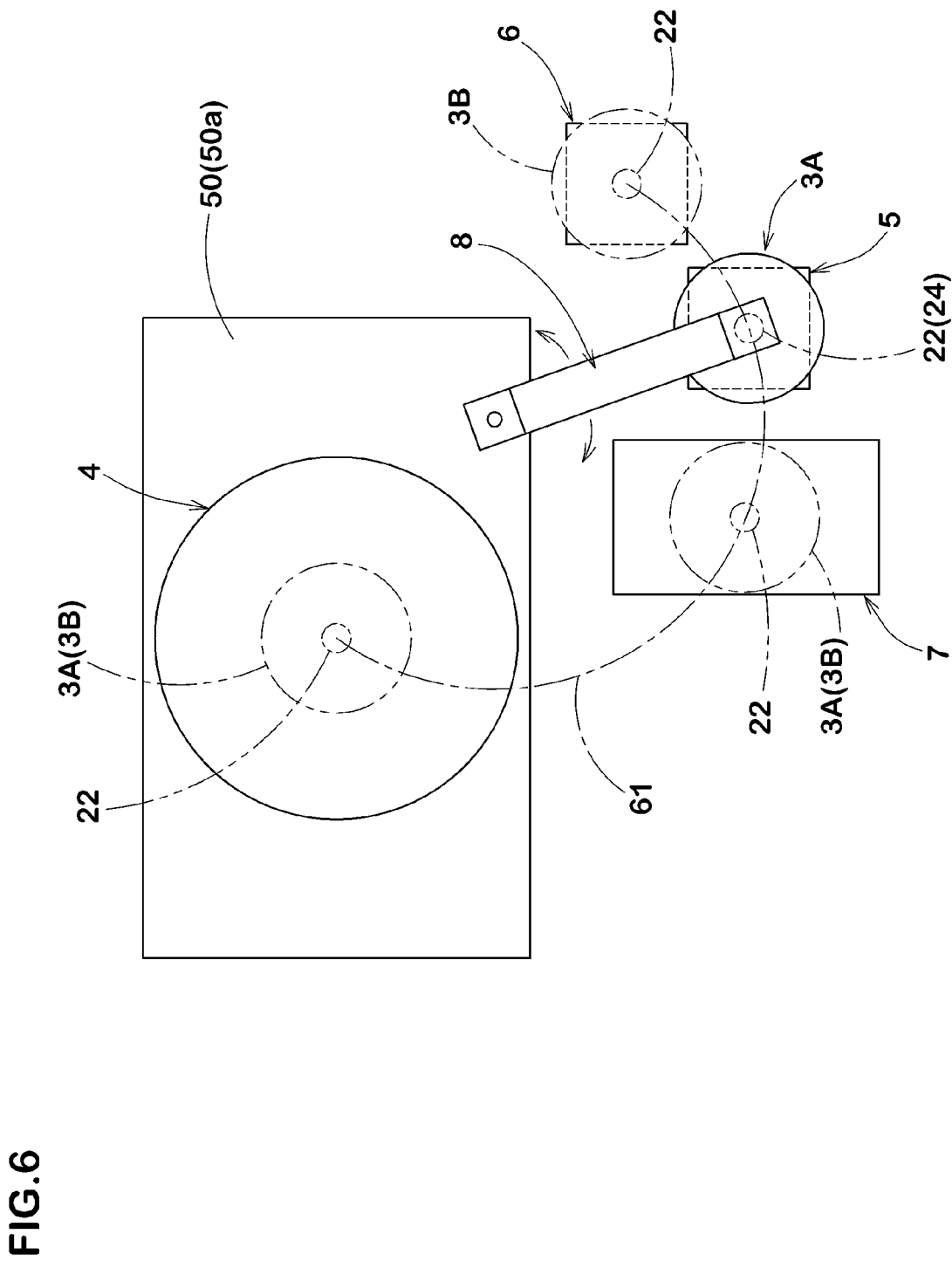
FIG. 6 is a plan view of a device used for the tire vulcanizing method according to the present embodiment.

As shown in FIGS. 1 and 6, in the vulcanizing method of the present embodiment, the rigid core 1, the vulcanizing mold 4, the preheating device 5 for heating rigid core accompanied by green tire 3A are employed. Furthermore, in the vulcanizing method, a cooling device 6 for cooling the rigid core accompanied by vulcanized tire 3B, which means a combination of the rigid core with the vulcanized tire (shown in FIG. 7) obtained from the green tire (shown in FIG. 2) through vulcanization process, is employed. The preheating device 5 and the cooling device 6 are arranged adjacent to the vulcanizing mold 4. Furthermore, in the vulcanizing method of the present embodiment, a conveying device 7 for transporting the rigid core accompanied by green tire 3A (the rigid core accompanied by vulcanized tire 3B) and a holding means 8 for holding the rigid core accompanied by green tire 3A (the rigid core accompanied by vulcanized tire 3B) are employed. The holding means 8 is also arranged adjacent to the vulcanizing mold 4.

Figure 7:
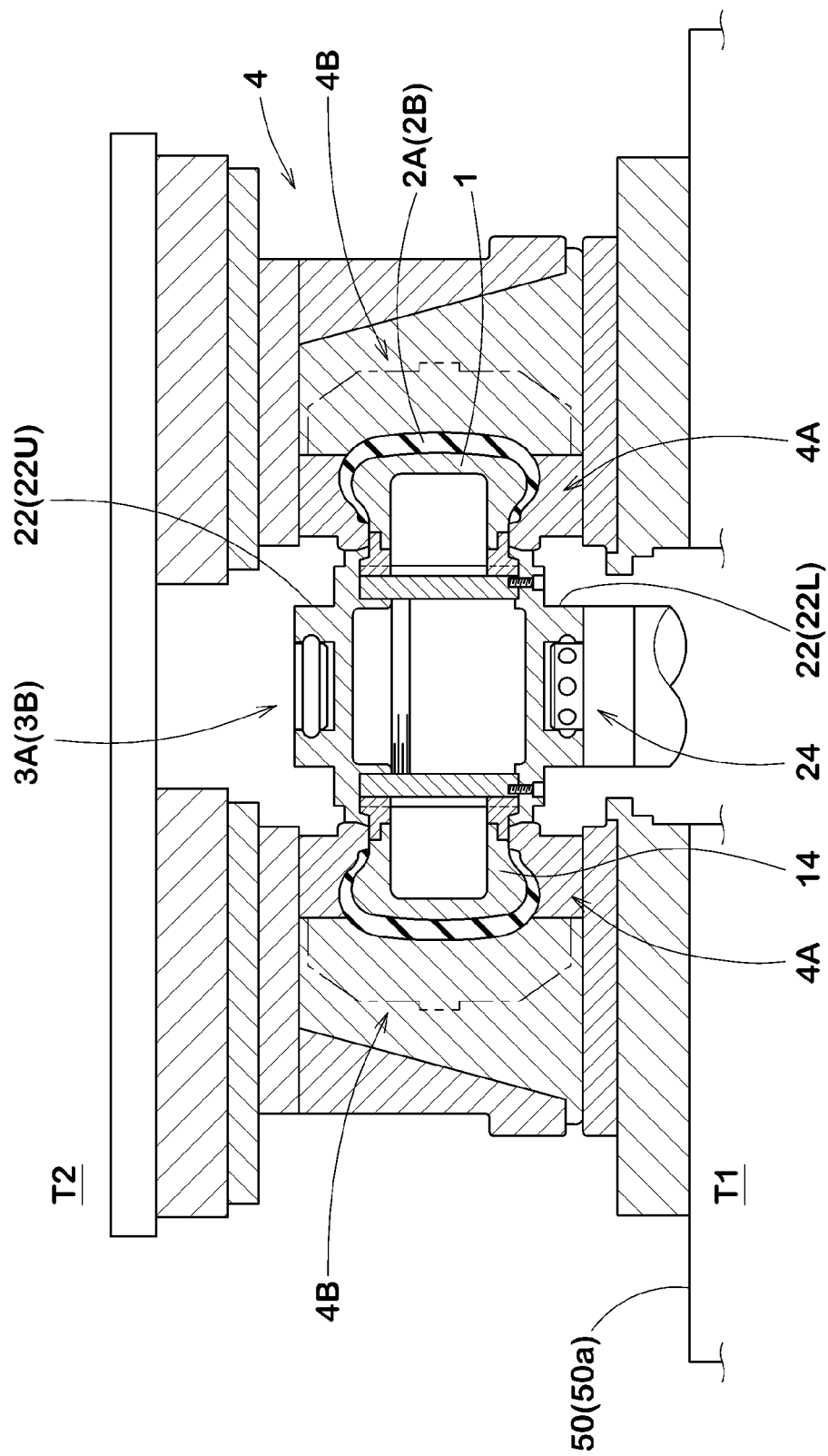
FIG. 7 is a side view showing the rigid core accompanied by green tire at the time of vulcanization with the vulcanizing mold.

As shown in FIG. 7, the vulcanizing mold 4 has a known structure except that it comprises the chuck portion 24. The vulcanizing mold 4 is arranged on a base board 50 comprising a horizontally extending supporting plate 50a.

The vulcanizing mold 4 comprises a lower mold 4A for forming the sidewall portion and the like of the green tire 2A at the first end side T1, and an upper mold 4B for forming the sidewall portion at the second end side T2 (upper side) of the segments 14 as well as the tread portion. Such a vulcanizing mold 4 can be opened and closed between a closed state (shown in FIG. 7) of being combined with the lower mold 4A and the upper mold 4B and an opened state (not shown) of separating the lower mold 4A and the upper mold 4B up and down. Thus, the vulcanizing mold 4 can easily get in and out the rigid core accompanied by green tire 3A (the rigid core accompanied by vulcanized tire 3B) in the opened state.

Figure 8:
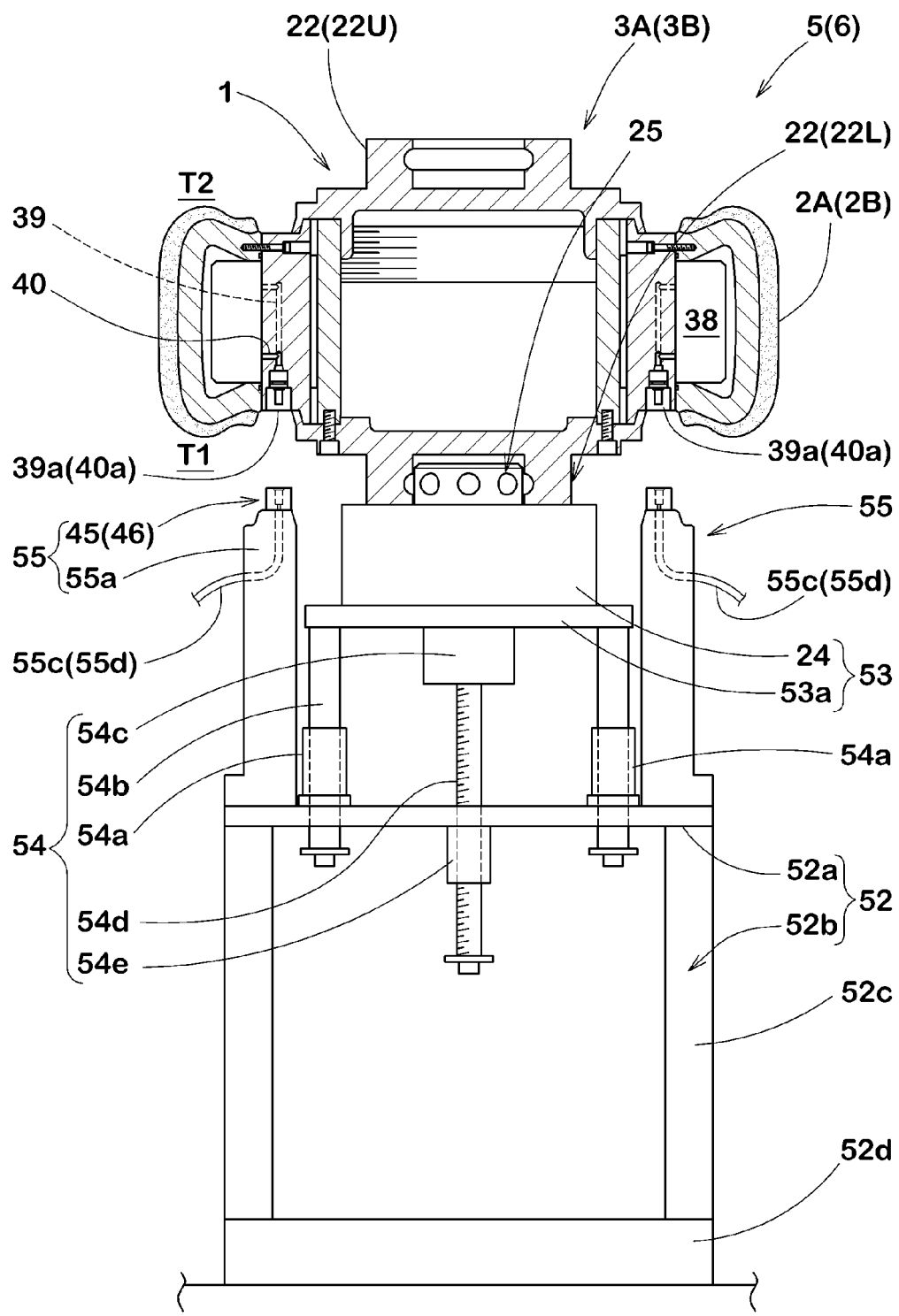
FIG. 8 is a side view showing an example of a preheating device (cooling device).
Figure 9:
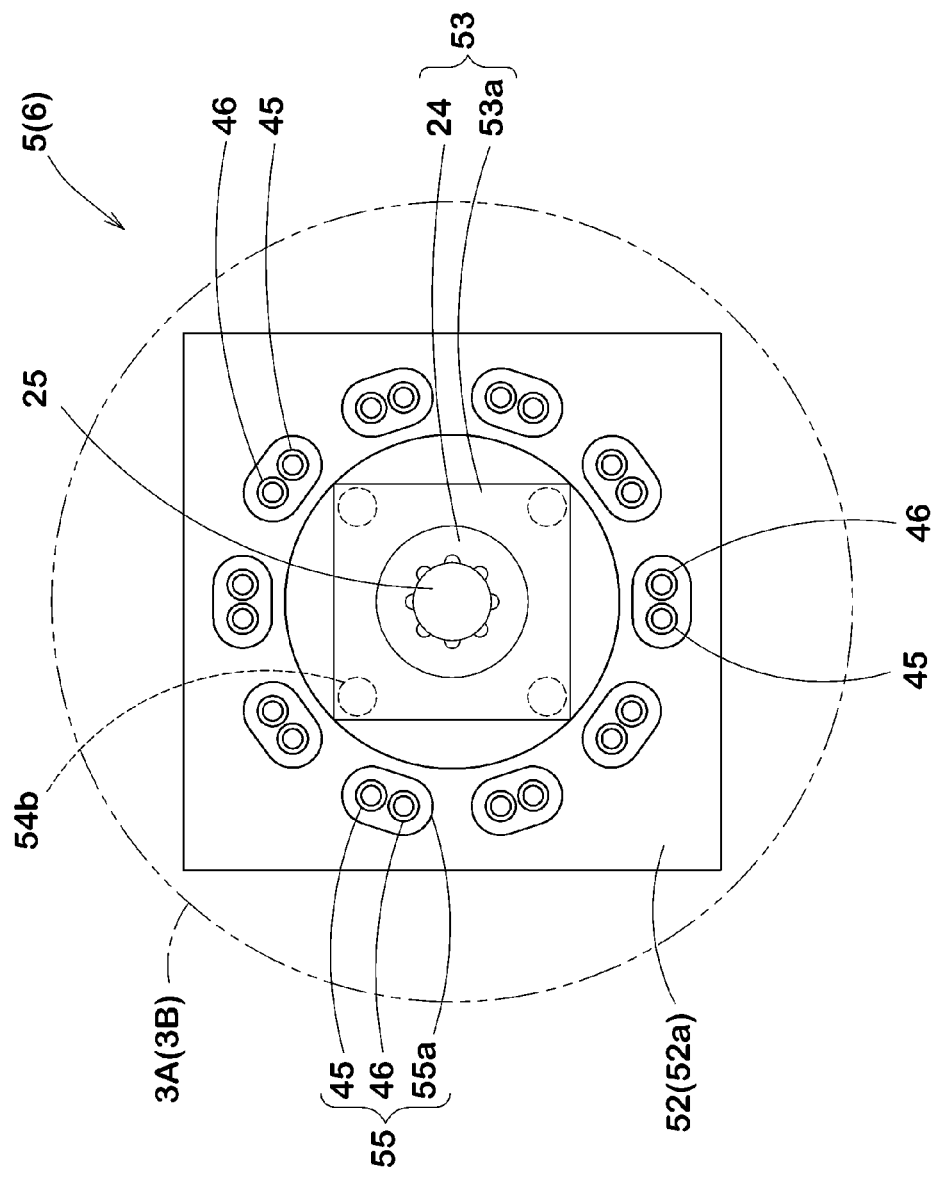
FIG. 9 is a plan view of FIG. 8.

As shown in FIGS. 8 and 9, the preheating device 5 is a device for preheating the rigid core accompanied by green tire 3A prior to the vulcanization. The preheating device 5 comprises abase board 52, a supporting board 53, an elevating means 54, and a high-temperature fluid supplying means 55.

The base board 52 comprises an upper plate 52a extending horizontally and a supporting leg portion 52b for holding the upper plate 52a. The supporting leg portion 52b comprises a vertical member 52c made from a frame member and a horizontal member 52d.

The supporting board 53 is provided for holding the rigid core accompanied by green tire 3A above the base board 52. The supporting board 53 of the present embodiment comprises a supporting plate 53a extending horizontally with a support by the elevating means 54, and the chuck portion 24 fixed on an upper surface of the supporting plate 53a. The supporting plate 53a is formed in a substantially rectangular shape in plane view.

The elevating means 54 is provided for holding the supporting board 53 movably up and down. The elevating means 54 of the present embodiment comprises a linear motion bearing 54a extending upward from an upper plate 52a of the base board 52, a rod portion 54b vertically supported by the linear motion bearing 54a, an electric motor 54c fixed to the supporting plate 53a of the supporting board 53, a threaded shaft 54d extending downward from the electric motor 54c, and a ball nut 54e screwed into the threaded shaft 54d. An upper end of the rod portion 54b is fixed to each of the four corners of the supporting plate 53a. The ball nut 54e is fixed to a substantial center of the upper plate 52a.

Figure 10:
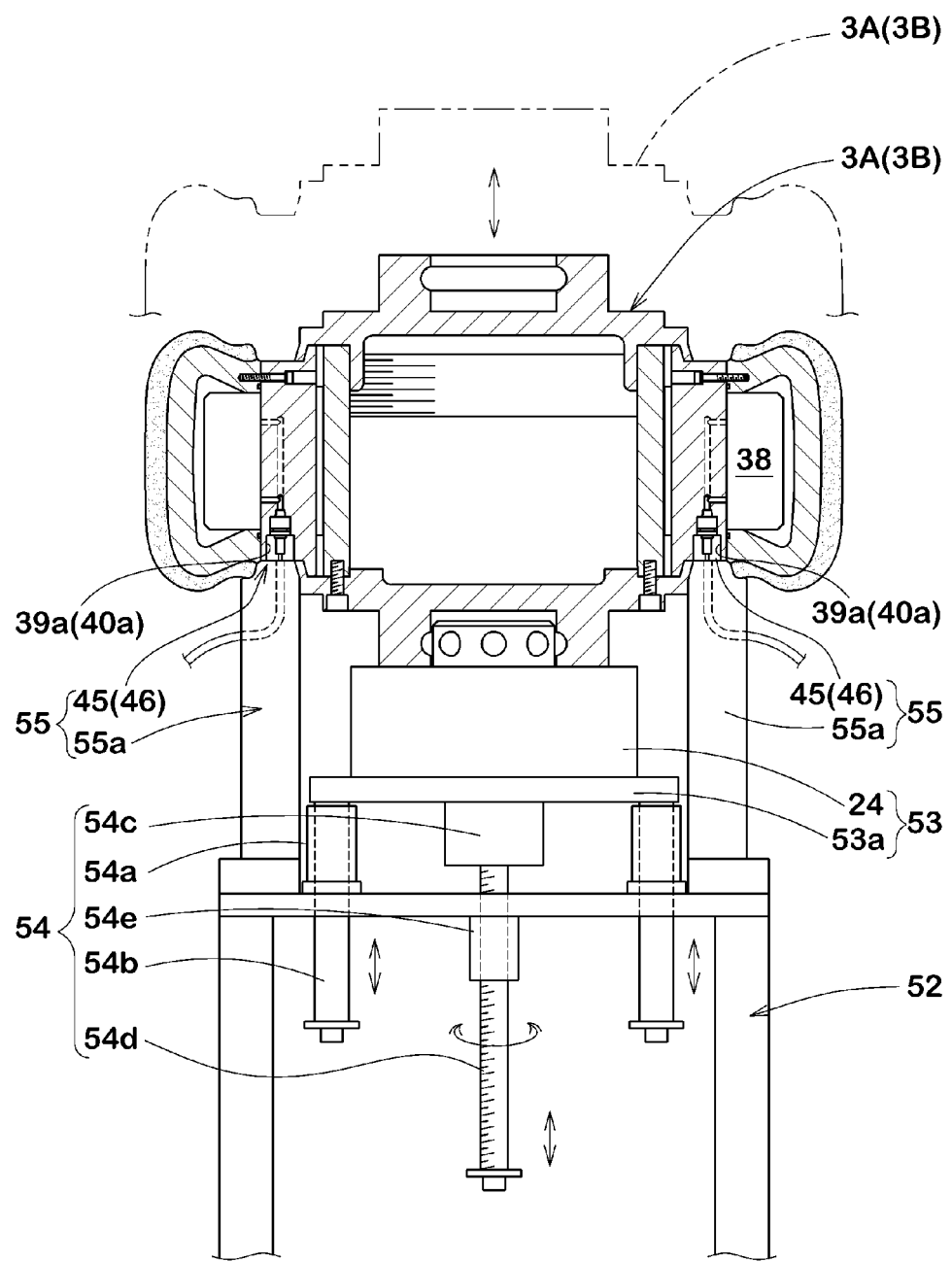
FIG. 10 is a side view explaining an up-and-down state of the preheating device (cooling device).

As shown in FIG. 10, the elevating means 54 can move the supporting plate 53a of the supporting board 53 up and down through the ball nut 54e owing to a forward or reverse rotation of the threaded shaft 54d rotated by the electric motor 54c. Also, the rod portion 54h is supported by the linear motion bearing 54a, thereby stably moving the supporting board 53 up and down.

As shown in FIGS. 8 and 9, the high-temperature fluid supplying means 55 is intended for supplying hot fluid into the chamber 38 of the rigid core accompanied by green tire 3A. The high-temperature fluid supplying means 55 of the present invention comprises an extending portion 55a extending upward from the upper plate 52a of the base board 52. The extending portion 55a supports the supply port 45 and the exhaust port 46. The high-temperature fluid supplying means 55 comprises a high-temperature fluid supplying equipment (not shown) for supplying high temperature fluid via the supply port 45.

The supply port 45 and the exhaust port 46 are aligned in a horizontal direction with the connecting port 39a of the supply flow passage 39 and the connecting port 40a of the exhaust flow passage 40 of the rigid core 1. In addition, such an alignment is preferably adjusted by use of a sensor and the like (not shown) when the rigid core accompanied by green tire 3A is fixed on the chuck portion 24.

As shown in FIG. 10, in the preheating device 5, the rigid core accompanied by green tire 3A is moved down by the elevating means 54, and the both connecting ports 39a and 40a of the supply flow passage 39 and the exhaust flow passage 40 can be connected to the supply port 45 and the exhaust port 46, respectively.

Thus, the preheating device 5 of the present embodiment can detachably attach the both connecting ports 39a and 40a to the supply port 45 and the exhaust port 46 by simply moving up and down the rigid core accompanied by green tire 3A. Therefore, as in the present embodiment, if the connecting ports 39a and 40a are provided in each of the segments 14, it can facilitate attachment and detachment of the supply port 45 and the exhaust port 46.

As shown in FIG. 8, each of the supply port 45 and the exhaust port 46 is connected to one end of the hoses 55c and 55d for guiding the fluid. Furthermore, another end of each of the hoses 55c and 55d is connected to the high-temperature fluid supplying equipment (not shown). The high-temperature fluid supplying equipment supplies the high-temperature fluid via the hose 55c to the supply port 45. Furthermore, the high-temperature fluid supplying equipment recovers the high-temperature fluid discharged from the exhaust port 46 via the hose 55d. Thus, the high-temperature fluid supplying means 55 can circulate to the chamber 38 of the rigid core accompanied by green tire 3A.

The cooling device 6 is a device for cooling the rigid core accompanied by vulcanized tire 3B. As shown in FIG. 6, the cooling device 6 spaced from the vulcanizing mold 4 more than the preheating device 5. This makes it possible to reduce the influence of the heat of the vulcanizing mold 4.

The cooling device 6 in accordance with the present embodiment has the same structure as the preheating device 5 exclusive of the high-temperature fluid supplying equipment (not shown) of the preheating device 5. The cooling device 6, instead of the high-temperature fluid supplying equipment, is provided with low-temperature fluid supplying equipment (not shown) for supplying and recovering the low-temperature fluid. Furthermore, the cooling device 6 is provided with the high-pressure air supplying equipment (not shown) for supplying and recovering the high-pressure air. Also, the hoses 55c and 55d are provided with a branching means (not shown) capable of switching the supply and recovery of the low-temperature fluid and the supply and recovery of the high-pressure air. Thus, the cooling device 6 can circulate in the chamber 38 of the rigid core accompanied by green tire 3A by switching between the low-temperature fluid and the high-pressure air.

Figure 11:
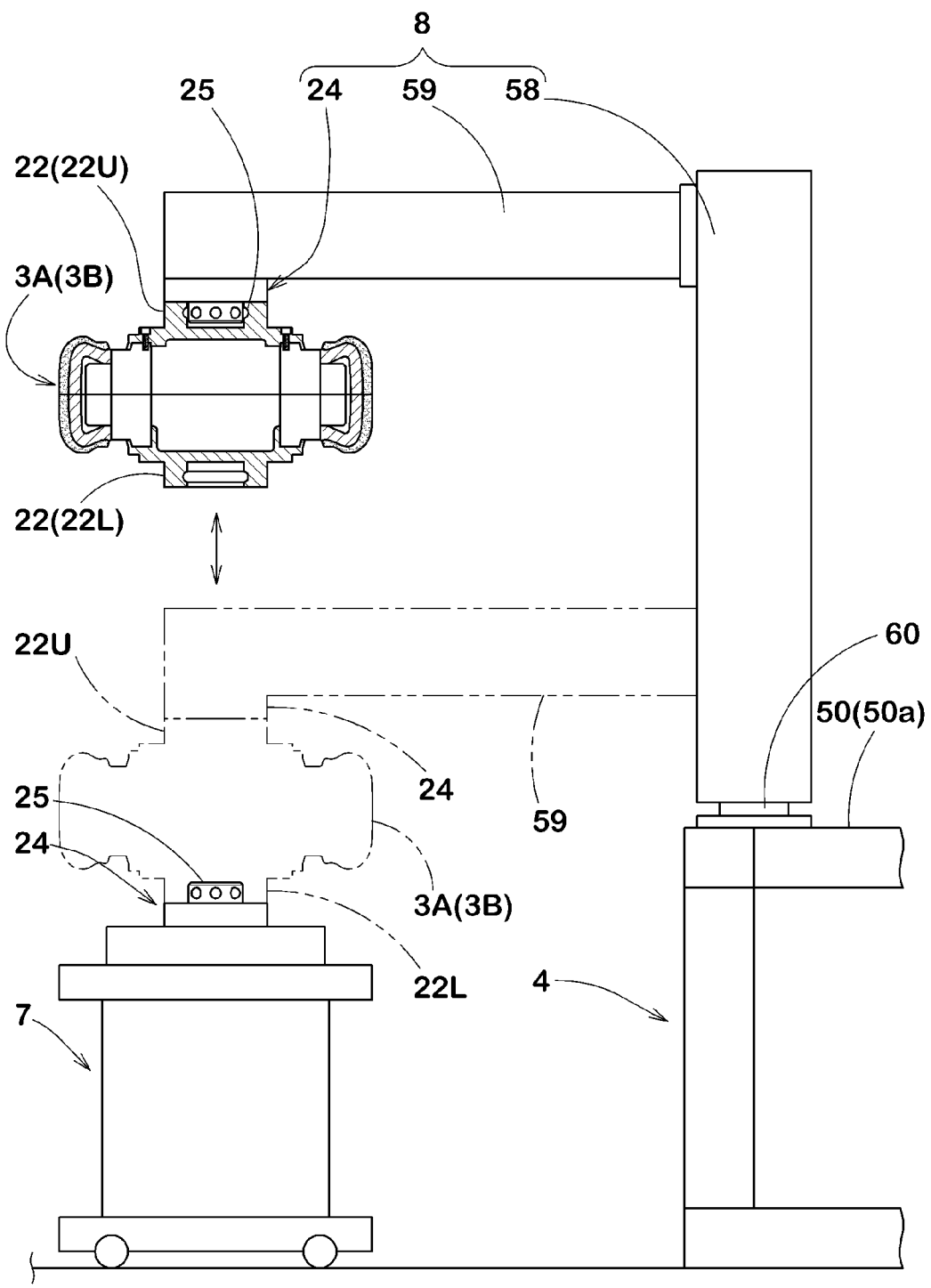
FIG. 11 is a side view showing an example of a holding means and a conveying device.

As shown in FIGS. 6 and 11, the conveying device 7 is provided for carrying the rigid core accompanied by green tire 3A and the rigid core accompanied by vulcanized tire 3B. For the conveying device 7, a known structure is employed except that it comprises a chuck portion 24. A stopping position of the conveying device 7 of the present embodiment is positioned between the vulcanizing mold 4 and the preheating device 5 on a circling trajectory 61 (shown in FIG. 6) of a holding means 8 described later.

The holding means 8 is provided for moving the rigid core accompanied by green tire 3A and the rigid core accompanied by vulcanized tire 3B among the vulcanizing mold 4, the preheating device 5, the cooling device 6 and the conveying device 7. The holding means 8 of the present embodiment is fixed on the base board 50 of the vulcanizing mold 4. The holding means S comprises a base 58 extending upward from the supporting plate 50a of the base board 50, an arm 59 which is horizontally extending and of which one end is supported on the base 58, and the chuck portion 24 fixed on the other side of arm 59. Also, the base 58 is provided with a linear motion device (not shown) for guiding arm 59 in a vertical direction.

Such a holding means 8, firstly, may connect the chuck portion 24 to the second support shaft portion 22U (upper side) of the rigid core accompanied by green tire 3A via the connecting means 25. Next, the holding means 8 may release the connection between the chuck portion 24 of the conveying device 7 and the first support shaft portion 22L (lower side) of the rigid core accompanied by green tire 3A. Then the holding means 8 can move up and down while holding the rigid core accompanied by green tire 3A by moving arm 59 up and down.

Furthermore, to release the holding of the vulcanized rigid core accompanied by tire 3A by the holding means 8, firstly, arm 59 is moved down so as to connect the chuck portion 24 of the conveying device 7 to the first support shaft portion 22L (lower side) of the rigid core accompanied by green tire 3A. Next, the chuck portion 24 of the holding means 8 is released from the connection with the second support shaft portion 22U (upper side) of the rigid core accompanied by green tire 3A. Thus, the holding means 8 can release the holding of the rigid core accompanied by tire 3A.

Furthermore, the holding means 8 includes a turning disk 60 arranged between the base 58 and the supporting plate 50a to support the base 58 rotatably around a vertical axis. Moreover, as shown in FIG. 6, the locations of the support shaft portion 22 of the rigid core accompanied by green tire 3A (rigid core accompanied by vulcanized tire 3B) placed on the vulcanizing mold 4, the preheating device 5, the cooling device 6 and the conveying device 7 are arranged on a circling trajectory 61 of the chuck portion 24 of the holding means 8. Thus, the holding means 8 can transfer the rigid core accompanied by green tire 3A among the vulcanizing mold 4, the preheating device 5, the cooling device 6 and the conveying device 7 without extending and retracting arm 59 in the horizontal direction.

Next, hereinafter, a vulcanizing method of the present embodiment will be described. As shown in FIG. 6, in the vulcanizing method of the present embodiment, firstly, a preheating step S1 of preheating the rigid core accompanied by green tire 3A is performed by use of the preheating device 5 prior to vulcanizing.

In the preheating step S1, firstly, a placing step S11 of placing the rigid core accompanied by green tire 3A in the preheating device 5 is performed. In the placing step S11, as shown in FIGS. 6 and 11, the rigid core accompanied by green tire 3A transferred by the conveying device 7 is transferred from the conveying device 7 to the preheating device 5 by use of the holding means 8. Thus, as shown in FIG. 8, the rigid core accompanied by green tire 3A is placed in the preheating device 5. At this time, the connecting port 39a and the supply port 45 are aligned in the horizontal direction. Also, the connecting port 40a and the exhaust port 46 are aligned in the horizontal direction.

After the placing step S11, a connecting step S12 of connecting the supply flow passage 39 of the rigid core accompanied by green tire 3A and the supply port 45 of the preheating device 5 is performed. In the present connecting step S12 the elevating means 54 of the preheating device 5 moves down the rigid core accompanied by green tire 3A. Thus, as shown in FIG. 10, the connecting port 39a of the supply flow passage 39 and the supply port 45 of the preheating device 5 are connected. At the same time, the connecting port 40a of the exhaust flow passage 40 of the rigid core accompanied by green tire 3A is connected to the exhaust port 46 of the preheating device 5.

Next, in the chamber 38 of the rigid core accompanied by green tire 3A, a high-temperature fluid supplying step S13 of supplying the high-temperature fluid is performed. In the high-temperature fluid supplying step S13, the high-temperature fluid is supplied into the supply flow passage 39. Moreover, the high-temperature fluid in the chamber 38 is recovered via the exhaust flow passage 40. Thus, the preheating device 5 can heat the rigid core accompanied by green tire 3A by circulating the high-temperature fluid in the chamber 38.

The high-temperature fluid desirably includes, but is not specifically limited to, easy-to-use steam. Also, the rigid core accompanied by green tire 3A is desirably heated to about 80 to 120 deg. C. in a thermometer (not shown) of the preheating device 5, for example. In addition, when the temperature is too high, there is a possibility that vulcanization of the green tire begins.

Next, after the high-temperature fluid supplying step S13, a disconnecting step S14 of disconnecting the connection between the supply flow passage 39 of the rigid core accompanied by green tire 3A and the supply port 45 of the preheating device 5 is performed. In the step S14, as shown in FIGS. 8 and 10, the elevating means 54 of the preheating device 5 moves the rigid core accompanied by green tire 3A. Thus, the connection between the connecting port 39a of the supply flow passage 39 and the supply port 45 of the preheating device 5 are disconnected. Furthermore, in the disconnecting step S14, the connection between the exhaust flow passage 40 of the rigid core accompanied by green tire 3A and the exhaust port 46 of the preheating device 5 are disconnected at the same time. These disconnections stop supplying the fluid into the chamber 38, and the heating of the rigid core accompanied by green tire terminates.

Next, a first transferring step S2 of transferring the preheated rigid core accompanied by green tire 3A from the preheating device 5 to the vulcanizing mold 4 is performed. In the first transferring step S2, as shown in FIGS. 6 and 11, the rigid core accompanied by green tire 3A is transferred from the preheating device 5 to the vulcanizing mold 4 in an open state by use of the holding means 8. Thereafter, as shown in FIG. 7, a lower mold 4A and an upper mold 4B are closed. Thus, the rigid core accompanied by green tire 3A is positioned in the vulcanizing mold 4.

Then, a vulcanizing step S3 of vulcanizing the preheated green tire accompanied by rigid core 3A by use of the vulcanizing mold 4 is performed. In the vulcanizing step S3, the green tire 2A is heated and vulcanized between the vulcanizing mold 4 and the rigid core 1, as usual.

In a continuous production line of the tire, the heat of vulcanization of the previous cycle is in store in the vulcanizing mold 4. In the present embodiment, in the preheating step S1, since the rigid core accompanied by green tire 3A is preheated, it is possible to reduce the temperature difference between the vulcanizing mold 4 and the rigid core 1 immediately after putting the rigid core accompanied by green tire 3A in the vulcanizing mold 4. Therefore, in the present invention, in the vulcanizing step S3, it is possible to effectively reduce a heating time of the rigid core 1.

Then, a second transferring step S4 of transferring the rigid core accompanied by vulcanized tire 3B comprising the tire 2B, which is made by vulcanizing the green tire 2A, from the vulcanizing mold 4 to the cooling device 6 is performed. As shown in FIGS. 6 and 11, in the second transferring step S2, the rigid core accompanied by vulcanized tire 3B is transferred from the vulcanizing mold 4 in an/the open state to the cooling device 6 by use of the holding means 8. Thus, as shown in FIG. 8, the rigid core accompanied by vulcanized tire 3B is positioned in the cooling device 6.

Then, using the cooling device 6, a cooling step S5 of cooling the rigid core accompanied by vulcanized tire 3B is performed. In the cooling step S5, firstly, as shown in FIGS. 8 and 10, a connecting step S51 is performed for connecting the supply flow passage 39 of the rigid core accompanied by vulcanized tire 3B and the supply port 45 of the cooling device 6. At the same time, the exhaust flow passage 40 of the rigid core accompanied by vulcanized tire 3B and the exhaust port 46 of the cooling device 6 are connected.

Then, a low-temperature fluid supplying step S52 of supplying the low-temperature fluid in the chamber 38 is performed. In the low-temperature fluid supplying step S52, the low-temperature fluid is supplied in the supply flow passage 39. Furthermore, the low-temperature fluid of the chamber 38 is recovered via the exhaust flow passage 40. Thus the cooling device 6 circulates the low-temperature fluid in the chamber 38, and it is possible to cool the rigid core accompanied by vulcanized tire 3B.

In this way, in the present embodiment, since the rigid core accompanied by vulcanized tire 3B is cooled by the cooling device 6 adjacent to the vulcanizing mold 4, the rigid core accompanied by vulcanized tire 3B is effectively cooled without the heat influence of the vulcanizing mold 4. Thus it is possible to considerably reduce the cycle time while reducing quality loss of the tire 2B caused by excessive vulcanization.

The low-temperature fluid desirably includes, but is not limited to, liquids, particularly water which is easy to handle. Furthermore, the cooling of the rigid core accompanied by vulcanized tire 3B is preferably performed before the temperature being about 35 to 40 deg. C. on a thermometer (not shown) of the cooling device 6, for example. This makes it possible to quickly remove the tire 2 from the rigid core 1.

Then, after the low-temperature fluid supplying step S52, a discharging fluid step S53 of discharging the liquid in the chamber is performed. This step S53 is performed, following the low-temperature fluid supplying step S52, in a state that the supply flow passage 39 is connected to the supply port 45 and that the exhaust flow passage 40 is connected to the exhaust port 46.

In the step S53, firstly, the branching means (not shown) changes from supply and recovery of the low-temperature fluid by the low-temperature fluid supplying equipment (not shown) to supply and recovery of the high-pressure air supplying equipment (not shown). Therefore, the cooling device 6 can circulate the high-pressure air in the chamber 38. Therefore, the cooling device 6 can effectively discharge the liquid in the chamber 38, thereby preventing earth leakage and the like.

Next, a disconnecting step S54 of disconnecting the supply flow passage 39 of the rigid core accompanied by vulcanized tire 3B and the supply port 45 of the cooling device 6 is performed. In this step S54, as shown in FIGS. 8 and 10, the rigid core accompanied by green tire 3A is uplifted by the elevating means 54 of the cooling device 6. Therefore, the connection between the connecting port 39a and the supply flow passage 39 and the supply port 45 of the cooling device 6 is disconnected. At the same time, the exhaust flow passage 40 of the rigid core accompanied by vulcanized tire 3B and the exhaust port 46 of the cooling device 6 are disconnected. These releases stop supplying the high-pressure air into the chamber 38.

Next, a transferring step S6 of transferring the rigid core accompanied by vulcanized tire 3B from the cooling device 6 to the conveying device 7 is performed. As shown in FIGS. 6 and 11, in the step S6, firstly the rigid core accompanied by vulcanized tire 3B is transferred from the cooling device 6 to the conveying device 7 by use of the holding means 8. Therefore, the rigid core accompanied by vulcanized tire 3B is positioned in the conveying device 7.

Thereafter, the conveying device 7 moves to the rigid core accompanied by vulcanized tire 3B to a prescribed position, and the tire 2B is released from the rigid core 1. Therefore, the tire 2B is manufactured.

Thus, in the vulcanizing method of the present invention, in the vulcanizing step S3 the heating time of the rigid core accompanied by green tire 3A and the cooling time of the rigid core accompanied by vulcanized tire 3B can be effectively reduced. Therefore, in the vulcanizing method of the present embodiment, it is possible to reduce the time that the rigid core accompanied by green tire 3A and the rigid core accompanied by vulcanized tire 3B take over the vulcanizing mold 4. Furthermore, since the preheating step S1, the vulcanizing step S3, and the cooling step S5 are performed in the preheating device 5, the vulcanizing mold 4, and the cooling device 6 respectively, it is possible to collaterally perform the respective steps. Therefore, in the vulcanizing method of the present embodiment, the cycle time can be effectively reduced.

While the particularly preferred embodiments of the present invention have been described in detail, the present invention is not limited to the illustrated embodiments, but can be modified and carried out in various aspects.

EXAMPLE

Figure 12A:
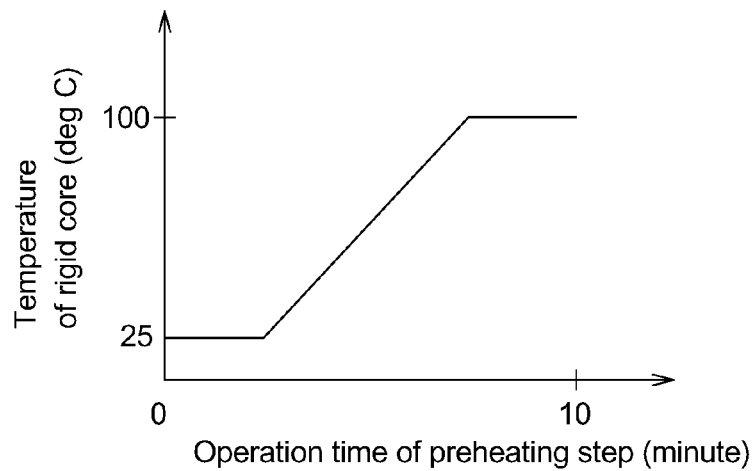
FIG. 12 (a) is a graph showing a relationship between the operation time of the preheating step and the temperature of the rigid core of the present embodiment; (b) is a graph showing a relationship between the operation time of the vulcanizing step and the temperature of the rigid core of the present embodiment; (c) is a graph showing a relationship between operation time of the cooling step and the temperature of the rigid core of the present embodiment.
Figure 12B:
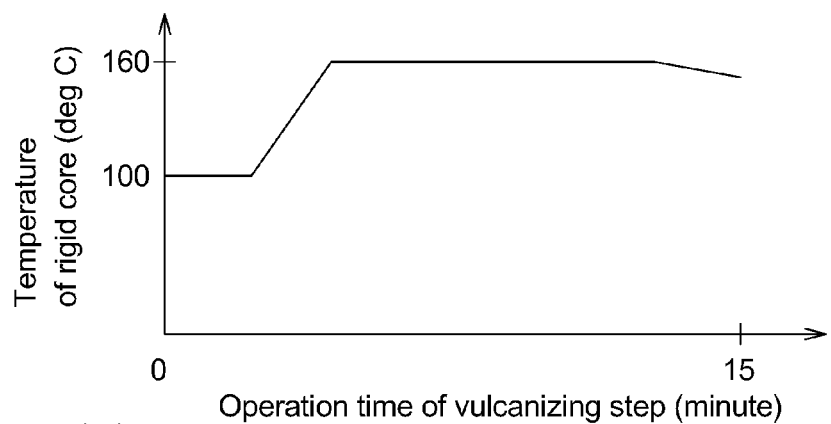
Figure 12C:
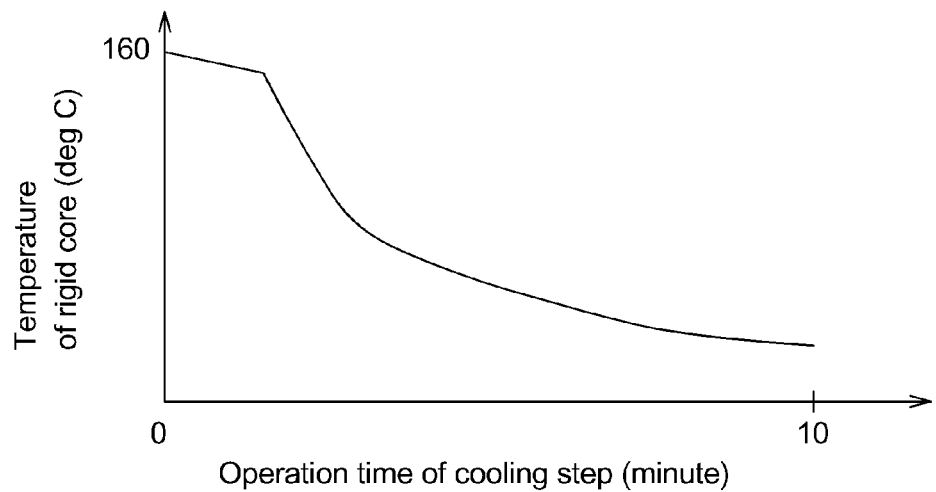

In order to confirm the effect of the present invention, using the preheating device, the vulcanization device, the cooling device, the conveying device and the holding means shown in FIG. 6, the green tire accompanied by a rigid core having a basic structure shown in FIG. 2 was vulcanized (Example). Then, in a preheating step, a vulcanizing step and a cooling step, each operation time and each temperature of the rigid core were measured. The results are shown in FIGS. 12(a)-(c).

Figure 13:
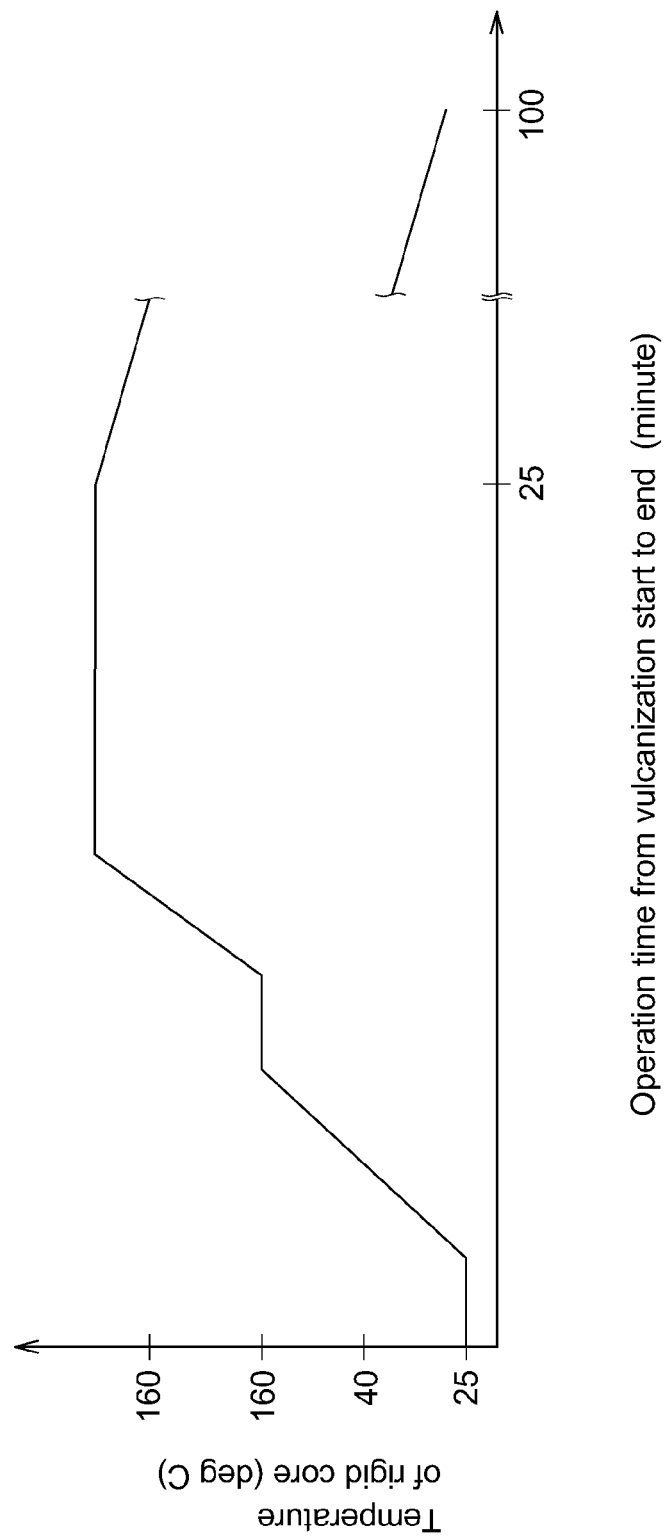
FIG. 13 is a relationship between the operation time from a vulcanization start to an end and the temperature of the rigid core of Comparative Example.

In addition, for comparison, by using only the vulcanization device, a green tire accompanied by the rigid core having the basic structure shown in FIG. 2 was vulcanized (Comparative Example). An operation time and a temperature of the rigid core measured from a vulcanization start to a cooling end of the green tire accompanied by rigid core. The results are shown in FIG. 13.

Results of the test, it was confirmed that a total time (35 minutes) between the vulcanization start and the cooling end in Example was able to make smaller than a total time (100 minutes) of Comparative Example. Furthermore, in Example, since the preheating step, the vulcanizing step and the cooling step were performed in the preheating device, the vulcanization device and the cooling device, a time of taking over the vulcanizing mold was 15 minutes. Therefore, the Example could greatly reduce the time of taking over the vulcanizing mold as compared with Comparative Example (100 minutes).

Furthermore, in Example, since the preheating step, the vulcanizing step and the cooling step were collaterally performed, the cycle time was 15 minutes. Therefore, the cycle time of Example could be greatly reduced as compared with Comparative Example (100 minutes).

The invention claimed is:

1. A tire vulcanizing method for vulcanizing a green tire formed on an outer surface of a rigid core by putting in a vulcanizing mold together with the rigid core, the method comprising:

a preheating step of preheating the rigid core accompanied by green tire using a preheating device arranged adjacent to the vulcanizing mold prior to vulcanizing, wherein the rigid core comprises a plurality of segments divided in a circumferential direction of the tire, each of the plurality of segments comprising a chamber disposed therein, each chamber being independent from each other, and wherein the preheating step includes a high-temperature fluid supplying step of supplying high-temperature fluid into each chamber;
a first transferring step of transferring the preheated rigid core accompanied by green tire from the preheating device to the vulcanizing mold;
a vulcanizing step of vulcanizing the green tire accompanied by preheated rigid core using the vulcanizing mold;
a second transferring step of transferring a rigid core accompanied by vulcanized tire obtained through the vulcanizing step to a cooling device arranged adjacent to the vulcanizing mold; and
a cooling step of cooling the rigid core accompanied by vulcanized tire using a cooling device.

2. The tire vulcanizing method as set forth in claim 1, wherein
each of the segments of the rigid core comprises a supply flow passage communicating with the chamber and having a connecting port on a surface of the segment,
the preheating device comprises a supply port detachably connected to the supply flow passage so that the high-temperature fluid is supplied to the supply flow passage via the connecting port, and
the preheating step further includes a step of connecting the connecting port of the supply flow passage of each of the segments of the rigid core accompanied by green tire with the supply port of the preheating device prior to the high-temperature fluid supplying step.

3. The tire vulcanizing method as set forth in claim 1, wherein the cooling step includes a low-temperature fluid supplying step of supplying low-temperature fluid into each chamber.

4. The tire vulcanizing method as set forth in claim 3, wherein
each of the segments of the rigid core comprises a supply flow passage for guiding the low-temperature fluid into the chamber,
the cooling device comprises a supply port detachably connected to the supply flow passage so that the low-temperature fluid is supplied to the supply flow passage, and
the cooling step further includes a step of connecting the supply flow passage of each of the segments of the rigid core accompanied by vulcanized tire with the supply port of the cooling device prior to the low-temperature fluid supplying step.

5. The tire vulcanizing method as set forth in claim 3, wherein
the low-temperature fluid is liquid; and
the cooling step further includes a step of discharging the liquid in the chamber after the low-temperature fluid supplying step.

6. The tire vulcanizing method as set forth in claim 1, wherein
upon the first transferring step and the second transferring step, a holding means for holding the rigid core arranged adjacent to the vulcanizing mold, the preheating device and the cooling device is used, and
the holding means, the vulcanizing mold, the preheating device and the cooling device comprise a detachably connecting means for automatic coupling with the inner mold.

7. A tire manufacturing method which comprises:
a green tire forming step of forming a green tire on an outer surface of a rigid core, and
a green tire vulcanizing step in accordance with the tire vulcanizing method as set forth in claim 1.

8. The tire vulcanizing method as set forth in claim 2, wherein the cooling step includes a low-temperature fluid supplying step of supplying low-temperature fluid into each chamber.

9. The tire vulcanizing method as set forth in claim 4, wherein
the low-temperature fluid is liquid; and
the cooling step further includes a step of discharging the liquid in the chamber after the low-temperature fluid supplying step.

10. The vulcanizing method as set forth in claim 6, wherein the rigid core comprises a support shaft portion,
wherein the holding means comprises a base extending upwardly, and a horizontally extending arm having one end rotatably supported by the base around a vertical axis and the other end having a chuck portion connectable to and removal from the support shaft of the rigid core, and
wherein each location of the support shaft portion of the rigid core accompanied by green tire or vulcanized tire placed on the vulcanizing mold, the preheating device, the cooling device and the conveying device are arranged on a circling trajectory of the chuck portion of the holding means.

11. The vulcanizing method as set forth in claim 2, wherein a connection between the connecting port of each of the segments of the rigid core and the supply port of the preheating device is done by an action that the rigid core accompanied by green tire is moved down.

12. The vulcanizing method as set forth in claim 11, wherein an automatically detachable connector pair that can supply the fluid only when they are connected are employed for the connection between the connecting port of each of the segments of the rigid core and the supply port of the preheating device.

* * * * *